United States Patent
Cho et al.

(10) Patent No.: US 10,759,411 B2
(45) Date of Patent: Sep. 1, 2020

(54) SYSTEM AND METHOD OF CONTROLLING THE REGENERATIVE BRAKING OF AN ECO-FRIENDLY VEHICLE

(71) Applicants: Hyundai Motor Company, Seoul (KR); Kia Motors Corporation, Seoul (KR)

(72) Inventors: Jin Kyeom Cho, Gyeonggi-do (KR); Sung Deok Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 93 days.

(21) Appl. No.: 15/807,346

(22) Filed: Nov. 8, 2017

(65) Prior Publication Data

US 2018/0251116 A1    Sep. 6, 2018

(30) Foreign Application Priority Data

Mar. 3, 2017   (KR) .................... 10-2017-0027435

(51) Int. Cl.
*B60W 20/14* (2016.01)
*B60W 30/18* (2012.01)

(52) U.S. Cl.
CPC ...... *B60W 20/14* (2016.01); *B60W 30/18127* (2013.01); *B60W 2510/083* (2013.01); *B60W 2510/087* (2013.01); *B60W 2710/083* (2013.01); *Y02T 10/7275* (2013.01)

(58) Field of Classification Search
CPC .......... B60W 20/14; B60W 30/18127; B60W 2510/083; B60W 2710/083; B60W 2510/087
See application file for complete search history.

(56) References Cited

U.S. PATENT DOCUMENTS

| | | | |
|---|---|---|---|
| 9,242,576 B1 * | 1/2016 | Turnbull | B60L 15/20 |
| 9,505,309 B2 * | 11/2016 | Takabayashi | B60T 1/10 |
| 2008/0144237 A1 * | 6/2008 | Hirasawa | H02P 29/032 361/25 |

(Continued)

*Primary Examiner* — Nicholas K Wiltey
*Assistant Examiner* — Tiffany K Luu
(74) *Attorney, Agent, or Firm* — Mintz Levin Cohn Ferris Glovsky and Popeo, P.C.; Peter F. Corless (57) ABSTRACT

A system and method of controlling regenerative braking of an eco-friendly vehicle are provided. The system eliminates a motor over-temperature state during regenerative braking, effectively prevents a chattering phenomenon in which regenerative braking torque is repeatedly increased and reduced after the motor over-temperature state, and consequently, improves the braking safety and operability of the vehicle. A torque output rate for motor regenerative braking torque limitation is determined from a current motor load and motor temperature using setting information when a motor over-temperature state is detected. Then, a final regenerative braking torque is determined by multiplying a motor regenerative braking torque, calculated from information including battery chargeable power and a driver braking operation value, by the determined torque output rate. Thereafter, regenerative braking of a motor is adjusted based on the determined final regenerative braking torque.

16 Claims, 4 Drawing Sheets

(56) References Cited

U.S. PATENT DOCUMENTS

| | | | | |
|---|---|---|---|---|
| 2009/0258755 A1* | 10/2009 | Kimura | ............... | B60W 10/08 477/107 |
| 2011/0276243 A1* | 11/2011 | Minarcin | ............. | B60W 10/08 701/70 |
| 2014/0222275 A1* | 8/2014 | Ohsumi | .................. | B60K 6/24 701/22 |

* cited by examiner

FIG. 1

RELATED ART

SYSTEM AND METHOD OF CONTROLLING THE REGENERATIVE BRAKING OF AN ECO-FRIENDLY VEHICLE

CROSS-REFERENCE TO RELATED APPLICATION

This application claims under 35 U.S.C. § 119(a) the benefit of priority to Korean Patent Application No. 10-2017-0027435 filed on Mar. 3, 2017, the entire contents of which are incorporated herein by reference.

BACKGROUND

(a) Technical Field

The present invention relates to a system and method of controlling regenerative braking of an eco-friendly vehicle, and more particularly, to a system and method of controlling regenerative braking, which perform regenerative braking limitation to eliminate a motor over-temperature state during regenerative braking.

(b) Background Art

As is well known, for an eco-friendly vehicle that travels using an electric motor as a vehicle drive source such as a hybrid electric vehicle (HEV), a pure electric vehicle (EV), and a fuel cell electric vehicle (FCEV), a regenerative braking mode is performed, in which the kinetic energy of the vehicle is collected as electrical energy via the electricity generation of a motor during braking to enable battery charging (motor charging). A regenerative braking system converts the kinetic energy of a vehicle into electrical energy during vehicle braking and stores the electrical energy in a battery to allow the electrical energy to be reused to drive a motor during vehicle traveling, therefore increasing the fuel efficiency of the vehicle.

A vehicle that performs regenerative braking requires a regenerative braking cooperative control technique, which adjusts the sum of regenerative braking torque (regenerative braking force) generated in the motor during regenerative braking and frictional braking torque (frictional braking force) generated in a frictional brake device to be equal to the total braking torque (target braking force) required upon a driver's brake operation. Accordingly, it is necessary to appropriately distribute the electrical braking force acquired by the electricity generation and rotational resistance of the motor, (i.e. the regenerative braking force and the frictional braking force acquired by the frictional brake device) and cooperative control between controllers needs to be appropriately performed.

A hydraulic brake device is usually used as the frictional brake device. In such a hydraulic brake device, target braking force, which is the driver-requested braking force, is calculated based on a brake signal that corresponds to a driver's brake operation (i.e. a signal from a brake pedal position sensor (BPS) based on a brake pedal operation) and the distribution of regenerative braking force and hydraulic braking force (frictional braking force) is performed to satisfy the target braking force. In addition, once regenerative braking torque and hydraulic braking torque have been determined via braking force distribution, regenerative braking control of the motor and control of the hydraulic brake device are performed to realize the respective distributed torque values.

Figure 1:
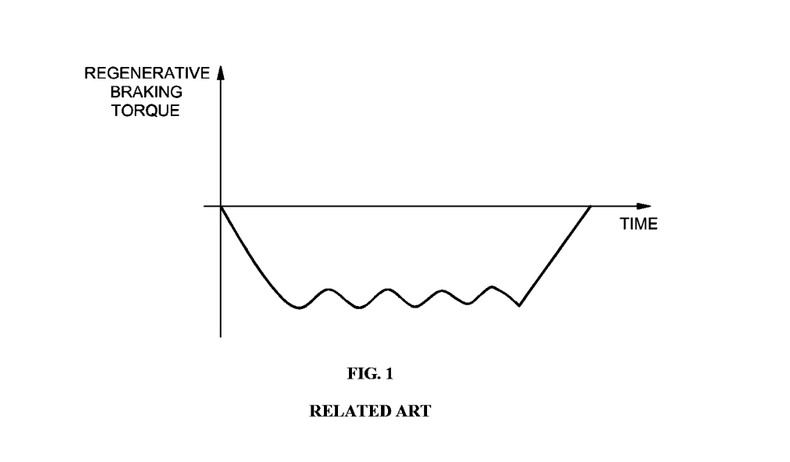
FIG. 1 is a view showing a problem of regenerative braking control in the related art.

Meanwhile, in the regenerative braking control of an eco-friendly vehicle, when a motor temperature is a particular temperature or greater during one regenerative braking cycle, a motor over-temperature situation is detected. In the motor over-temperature situation, a motor regenerative braking amount (i.e. motor regenerative braking torque and motor output during regenerative braking) is limited in proportion to the motor temperature when a particular temperature is exceeded. However, when the motor regenerative braking amount is limited based only on the motor temperature as in the related art, the process "increase in motor temperature→reduction in motor regenerative braking torque→reduction in motor temperature→increase in motor regenerative braking torque→increase in motor temperature" is repeated during regenerative braking. As illustrated in FIG. 1, a chattering phenomenon, in which the value of motor regenerative braking torque (negative torque) is repeatedly increased and reduced, occurs, which deteriorates the braking safety and operability of the vehicle.

SUMMARY

The present invention provides a system and method of controlling regenerative braking of an eco-friendly vehicle. The system may rapidly eliminate a motor over-temperature state during regenerative braking; effectively prevent a chattering phenomenon in which regenerative braking torque is repeatedly increased and reduced after the motor over-temperature state; and improve, consequently, the braking safety and operability of the vehicle.

In one aspect, the present invention provides a method of controlling regenerative braking of an eco-friendly vehicle that may include: determining, by a controller, whether a motor over-temperature state exists, from a current motor temperature input during regenerative braking; determining, by the controller, a torque output rate for motor regenerative braking torque limitation from a current motor load and the current motor temperature using setting information when the motor over-temperature state is detected; determining, by the controller, a final regenerative braking torque by multiplying a motor regenerative braking torque, which is calculated from information including battery chargeable power and a driver braking operation value, by the determined torque output rate; and adjusting, by the controller, regenerative braking of a motor based on the determined final regenerative braking torque.

In another aspect, the present invention provides a system of controlling regenerative braking of an eco-friendly vehicle that may include: an output rate calculation unit configured to determine whether a motor over-temperature state exists from a current motor temperature input during regenerative braking and to determine a torque output rate for motor regenerative braking torque limitation from a current motor load and the current motor temperature using setting information when the motor over-temperature state is detected; a torque limitation unit configured to determine a final regenerative braking torque by multiplying a regenerative braking torque, which is calculated from information including battery chargeable power and a driver braking operation value, by the determined torque output rate, to enable implementation of regenerative braking torque limitation; and a motor controller configured to adjust regenerative braking of a motor based on the determined final regenerative braking torque.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although an exemplary embodiment is described as using a plurality of units to perform the exemplary process, it is understood that the exemplary processes may also be performed by one or a plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiment of the present invention will be described in detail with reference to the accompanying drawings to allow those skilled in the art to easily practice the present invention. However, the present invention is not limited to the embodiments disclosed herein, but may be implemented in various different forms.

The present invention relates to a system and method of controlling regenerative braking, which perform motor regenerative braking limitation to eliminate a motor over-temperature state during regenerative braking.

In the present invention, motor regenerative braking limitation may be performed when a current motor temperature exceeds a preset over-temperature judgment critical temperature Tover. When the motor temperature exceeds the over-temperature judgment critical temperature, the motor regenerative braking limitation includes a process of limiting motor regenerative braking torque by a torque output rate (%), determined based on a motor load and motor temperature (i.e. a process of limiting a motor output during regenerative braking).

In other words, after a regenerative braking torque value (i.e. a torque value before limitation) is determined using a typical method based on, for example, battery state information such as battery chargeable power, a torque output rate is determined based on a current motor load and motor temperature when a motor over-temperature state is detected, and a final regenerative braking torque value is calculated by limiting the regenerative braking torque value by the torque output rate. The calculated final regenerative braking torque value is used as a torque command value for motor regenerative braking control.

When the regenerative braking torque value is limited by the torque output rate (%) (e.g., a value less than 100%), the final regenerative braking torque value is reduced compared to the regenerative braking torque value before the limitation. When motor regenerative braking is adjusted based on, as a command value, reduced regenerative braking torque, i.e. the regenerative braking torque value limited by the torque output rate, the motor over-temperature state may be eliminated, and in particular, a chattering phenomenon, in which motor regenerative braking torque is repeatedly increased and reduced during one regenerative braking cycle, may be prevented, and consequently, the braking safety and operability of the vehicle may be improved.

Figure 2:
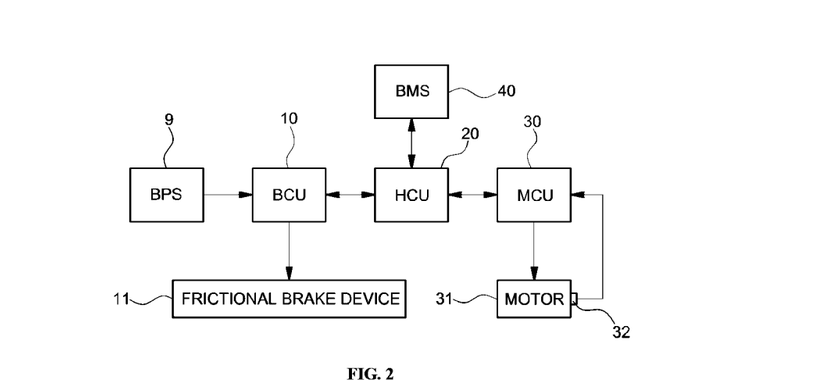
FIG. 2 is a block diagram illustrating the configuration of a regenerative braking system according to an exemplary embodiment of the present invention.

Hereinafter, the system and method of controlling regenerative braking according to an exemplary embodiment of the present invention will be described in more detail. FIG. 2 is a block diagram illustrating the configuration of an entire regenerative braking system according to the present invention. As illustrated, regenerative braking of an eco-friendly vehicle is performed via cooperative control of multiple controllers in the vehicle.

For example, a hybrid control unit (hereinafter referred to as "HCU") 20, which is a superordinate controller within the vehicle, and a brake control unit (hereinafter referred to as "BCU") 10, configured to perform automated control of the vehicle, perform cooperative control for regenerative braking. In particular, the BCU 10 may be configured to perform braking force distribution, and operate a frictional brake device 11 (e.g. a typical hydraulic brake device) to generate distributed frictional braking force.

The HCU 20 may be configured to determine regenerative braking torque, used as a motor torque command value used to generate distributed regenerative braking force. In addition, the HCU 20 may be configured to determine the regenerative braking torque based on information such as, for example, battery state information such as battery chargeable power (maximum charging power) and motor state information such as a motor temperature. Therefore, a battery management system (hereinafter referred to as "BMS") 40, which collects battery state information and provides the same to the HCU 20, and a motor control unit (hereinafter referred to as "MCU") 30, which provides information such as, for example, a motor temperature, to the HCU 20 may be in cooperative control for regenerative braking.

Particularly, the MCU 30, which performs motor control, may be configured to adjust regenerative braking of a motor 31 in response to a regenerative braking torque command transmitted from the HCU 20. More specifically, the BCU 10 may be configured to determine a vehicle-requested total braking amount (e.g., the baking amount may be a torque value) based on a driver braking operation value, and determine a regenerative braking tolerance from the total braking amount. The driver braking operation value may be a pedal input value based on a driver brake pedal operation state, and more specifically, may be a brake pedal depth or engaged amount (or a brake pedal stroke), which is a signal value of a brake pedal position sensor (BPS) 9.

In addition, the BCU 10 may be configured to transmit the determined regenerative braking tolerance to the HCU 20, and the HCU 20 may be configured to determine regenerative braking torque based on the regenerative braking tolerance using information such as, for example, battery chargeable power. Accordingly, in a normal state in which a motor over-temperature state does not exist, the HCU 20 may be configured to generate a command (i.e. a regenerative braking torque command) based on the determined regenerative braking torque and output the same to the MCU 30, and the MCU 30 may be configured to adjust a regenerative braking operation of the motor 31 to generate regenerative braking force in response to the regenerative braking torque command received from the HCU 20.

In addition, the HCU 20 may be configured to calculate a regenerative braking execution amount based on a speed change state using speed change information received from a transmission control unit (TCU), and the BCU 10 may be configured to receive the regenerative braking execution amount from the HCU 20 to finally determine a frictional braking amount by subtracting the regenerative braking execution amount from the total braking amount. Subsequently, the BCU 10 may be configured to operate the frictional brake device 11 to generate frictional braking force, which corresponds to the finally determined frictional braking amount. In conclusion, the driver-requested total braking force may be satisfied by the regenerative braking force from the motor 31 and the frictional braking force from the frictional brake device 11.

In the above description, although the HCU 20 may be configured to determine regenerative braking torque using information such as, for example, battery chargeable power, in the present invention, the HCU 20 may be configured to perform torque limitation to reduce regenerative braking torque based on a current motor load and motor temperature when the motor temperature is greater than an over-temperature judgment critical temperature Tover (e.g., about 150° C.).

Figure 3:
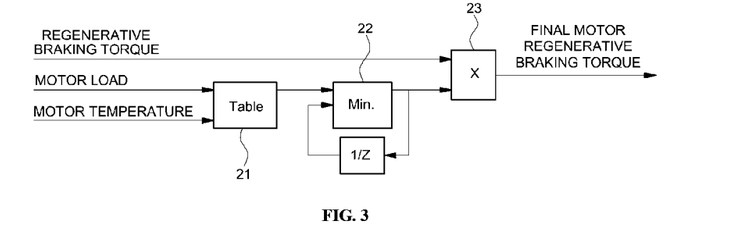
FIG. 3 is a block diagram illustrating the configuration to perform torque limitation in the regenerative braking control system according to an exemplary embodiment of the present invention.

Hereinafter, a torque limitation process to eliminate a motor over-temperature state will be described. FIG. 3 is a block diagram illustrating the configuration to perform torque limitation in the regenerative braking control system according to the present invention. The configuration to perform torque limitation may be provided in the HCU 20.

Referring to FIG. 3, the HCU 20 may be configured to receive a motor temperature detected by a sensor 32 on the motor 31 side via the MCU 30. The configuration to perform torque limitation in the HCU 20 may include an output rate calculation unit 21, configured to determine whether a motor over-temperature state exists upon receiving a current motor temperature and determine a torque output rate (%) based on a current motor load and motor temperature when the motor over-temperature state is detected, and a torque limitation unit 23, configured to determine final regenerative braking torque, which is reduced, i.e. limited, from regenerative braking torque using the determined torque output rate to enable regenerative braking torque limitation.

The output rate calculation unit 21 may be configured to determine and output the torque output rate based on an input motor load and motor temperature. The output rate calculation unit 21 may be configured to determine the torque output rate (%) based on the motor load and motor temperature using setting information stored in advance. In particular, the torque output rate is a physical vehicle test value that is determined using preceding research and test and evaluation processes with respect to a corresponding vehicle in the vehicle development stage. The torque output rate may be determined as a test value acquired in the preceding research and test and evaluation processes for the elimination of a motor over-temperature state.

Figure 4:
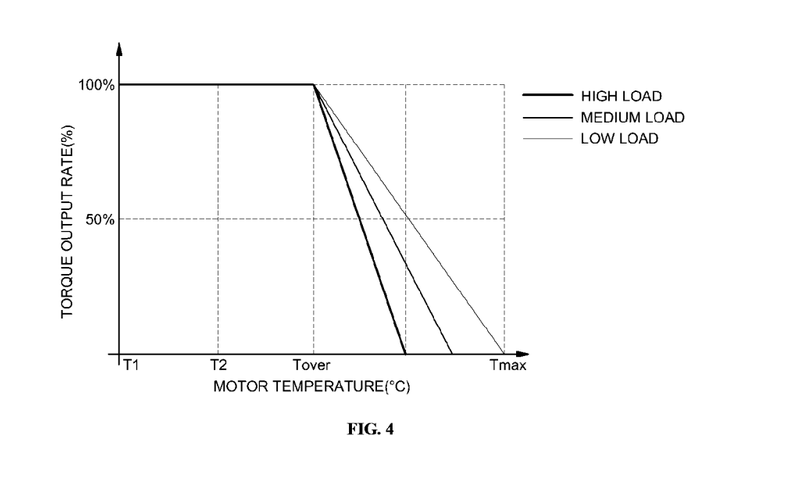
FIG. 4 is a view illustrating the exemplary setting of a torque output rate based on a motor load and motor temperature according to an exemplary embodiment of the present invention.

In the present invention, the setting information required to determine the torque output rate may include a value based on motor state information such as a motor load and motor temperature. The torque output rate may be preset information. An example of the setting information is illustrated in FIG. 4. The setting information may be, for example, table or map data in which the torque output rate is set as a value based on a motor load and motor temperature. FIG. 4 illustrates the diagram of the setting information.

The setting information may be stored in advance in the output rate calculation unit 21 as will be described below. In the setting information, the torque output rate may be a percentage value that is greater than 0 and less than 100. In addition, the setting information may include the over-temperature judgment critical temperature Tover for determining whether to perform torque limitation. The motor over-temperature state is detected when a motor temperature detected by the sensor 32 is greater than the over-temperature judgment critical temperature Tover.

In addition, the setting information may include a torque output rate value, by which regenerative braking torque is reduced under a greater temperature range than the over-temperature judgment critical temperature to allow torque limitation to be performed in the motor over-temperature state. In FIG. 4, "Tmax" represents a maximum motor temperature tolerance.

In the present invention, the torque output rate refers to a rate that limits a value of motor regenerative braking torque (i.e. torque before limitation, hereinafter referred to as "initial regenerative braking torque") that is determined using a typical method based on a driver braking operation value (i.e. a BPS signal value) and information including battery chargeable power. The torque output rate refers to a ratio of final motor regenerative braking torque to initial regenerative braking torque.

Referring to FIG. 4, to show that no torque limitation is performed in a temperature range that is equal to or less than the over-temperature judgment critical temperature Tover, the torque output rate is written as 100%. However, to allow torque limitation to be performed in a greater temperature range than the over-temperature judgment critical temperature Tover, as illustrated in FIG. 4, the torque output rate (%) is set to a value based on a motor load and motor temperature, more particularly, a value that is less than 100%.

In addition, in the setting information, the torque output rate value may be set to a lower value as the motor temperature increases. The torque output rate value may be set to be linearly reduced as the motor temperature is increased. In particular, in the setting information, the torque output rate value may be set to a lower value as the motor temperature increases under the same motor load condition. In addition, as illustrated in FIG. 4, in the setting information, the torque output rate value may be set to a lower value as the motor load increases under the same motor temperature condition.

In an exemplary embodiment, a motor load may be divided into a low load range, which is less than a first critical value (that is preset), a medium load range, which is equal to or greater than the first critical value and is less than a second critical value (that is preset), and a high load range, which is equal to or greater than the second critical value. Under the same motor temperature condition, the torque output rate value may be set to a lower value at a high load than that at a medium load and may be set to a lower value at a medium load than that at a low load. The motor load may be a motor torque value. Since motor torque (regenerative braking torque) has a negative value upon regenerative braking, a high motor load refers to the absolute value of motor torque (regenerative braking torque) being greater than at a medium motor load, and a low motor load refers to the absolute value of motor torque being less than that at a medium load.

Particularly, the motor load refers to initial motor torque, i.e. initial motor regenerative braking torque before limitation is performed. For example, on the basis of an initial motor regenerative braking torque (Nm) value, the case of 0<torque<−40 may be set to a low load state, the case of −40≤torque<−80 may be set to a medium load state, and the case of −80≤torque<−160 may be set to a high load state.

In addition, in the setting information, when the torque output rate is set to be linearly reduced based on a motor temperature within a greater temperature range than the over-temperature judgment critical temperature Tover, the gradient of reduction in the torque output rate, which is decreased as the motor temperature is increased, may be set to be maximum at a high load, to be minimum at a low load, and to be a value between the high load and the low load at a medium load. Accordingly, the output rate calculation unit 21 may be configured to determine the torque output rate for regenerative braking torque limitation in real time based on an input motor load and motor temperature. In an exemplary embodiment, the HCU 20 may further include an output rate decision unit 22, configured to detect the lowest value among torque output rates, determined by the output rate calculation unit 21 for each predetermined control period during one regenerative braking cycle, and output the detect value to the output rate calculation unit 21.

To prevent a chattering phenomenon in which motor regenerative braking torque is repeatedly increased and reduced as a motor temperature is repeatedly increased and reduced in a motor over-temperature state during regenerative braking, the lowest value among torque output rates acquired during one regenerative braking cycle may be continuously maintained. In other words, when a current torque output rate, which is acquired from a motor load and motor temperature during one regenerative braking cycle, is greater than a previous value, the previous lower torque output rate may be continuously applied. In particular, one regenerative braking cycle refers to the time duration from the driver brake-in time to the driver brake-out time. In other words, one regenerative braking cycle indicates the time duration from the time when the driver engages a brake pedal (i.e. the brake pedal press time) to the time when the driver disengages the brake pedal (i.e. the brake pedal release time).

When the torque output rate is finally determined as described above, the torque limitation unit 23 may be configured to calculate final motor regenerative braking torque using the input torque output rate and initial regenerative braking torque. The torque limitation unit 23 may then be configured to calculate a final motor regenerative braking torque by multiplying the initial regenerative braking torque by the torque output rate (%), and the HCU 20 may be configured to produce a regenerative braking torque command that corresponds to the final motor regenerative braking torque value to transmit the command to the MCU 30, which is a motor controller. Accordingly, the MCU 30 may be configured to adjust the regenerative braking of the motor 31 in response to the regenerative braking torque command to generate regenerative braking force.

Figure 5:
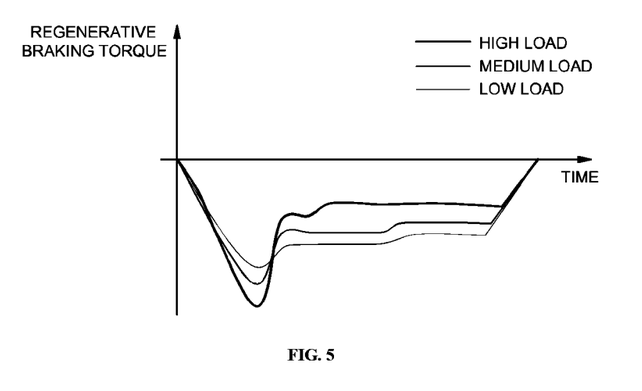
FIG. 5 is a view illustrating the result of performing motor regenerative braking amount limitation based on a motor load and motor temperature according to an exemplary embodiment of the present invention.

FIG. 5 is a view illustrating the result of performing motor regenerative braking amount limitation (regenerative braking torque limitation) based on a motor load and motor temperature according to the present invention. FIG. 5 illustrates the improved motor regenerative braking torque state due to the implementation of motor regenerative braking amount limitation according to the present invention. In FIG. 5, the motor regenerative braking torque is the final motor regenerative braking torque calculated by the torque limitation unit 23. As illustrated, as the result of motor regenerative braking torque limitation is performed based on a motor load and motor temperature to eliminate a motor over-temperature state during one regenerative braking cycle, almost constant regenerative braking torque is maintained without a chattering phenomenon illustrated in FIG. 1. Accordingly, conventional problems of deterioration in braking safety and operability due to a chattering phenomenon may be solved.

Figure 6:
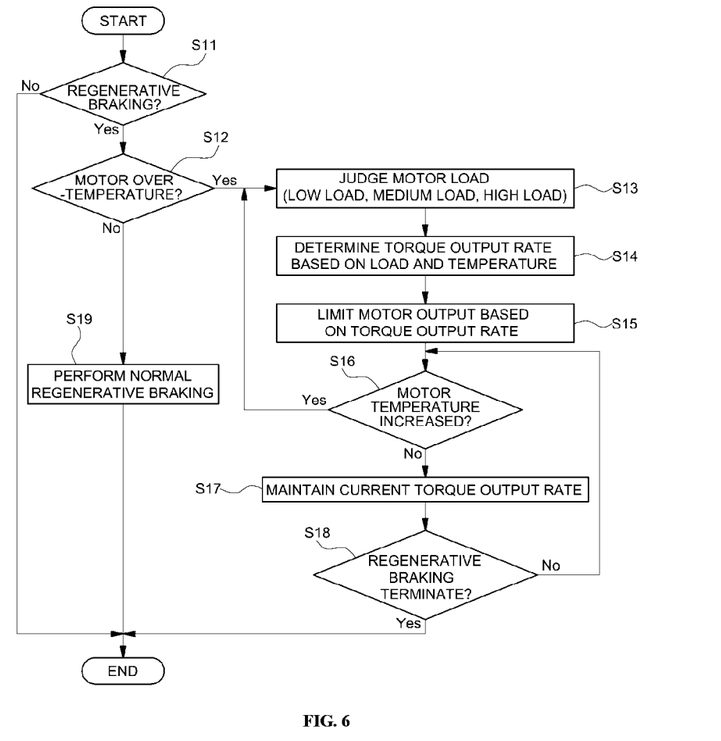
FIG. 6 is a flowchart illustrating a regenerative braking control process according to an exemplary embodiment of the present invention.

FIG. 6 is a flowchart illustrating a regenerative braking control process according to an exemplary embodiment of the present invention. The regenerative braking control process will be described below with reference to FIG. 6 and the method described herein below may be executed by an overall controller having a processor and a memory. First, when regenerative braking begins in response to the driver engaging the brake pedal, the HCU 20 may be configured to receive a regenerative braking tolerance from the BCU 10 and detect the start of regenerative braking (S11).

Subsequently, since the HCU 20 may be configured to receive a motor temperature detected by the sensor 32 on the motor 31 side, the HCU 20 may be configured to detect a motor over-temperature state by comparing the input motor temperature with the over-temperature judgment critical temperature Tover (S12). In particular, the HCU 20 may be configured to determine that the motor over-temperature state is present when the detected motor temperature is equal to or less than the over-temperature judgment critical temperature and may be configured to detect the motor over-temperature state when the detected motor temperature is greater than the over-temperature judgment critical temperature.

Regenerative braking is typically performed when the motor over-temperature state is detected (S19). Accordingly, motor regenerative braking amount limitation (regenerative braking torque limitation) is not performed. In other words, the HCU 20 is configured to output, as a command value, regenerative braking torque (i.e. initial regenerative braking torque) acquired by a typical or known method from information such as, for example, battery chargeable power without torque limitation, and the MCU 30 is configured to adjust motor regenerative braking to generate regenerative braking force in response to the regenerative braking torque command received from the HCU 20.

On the other hand, motor regenerative braking amount limitation (regenerative braking torque limitation) is performed when the motor over-temperature state exists. In this process, the output rate calculation unit 21 included in the HCU 20 may be configured to determine a motor output rate used to limit a regenerative braking amount, i.e. a torque output rate used to limit motor regenerative braking torque from motor state information such as a motor load and motor temperature, to eliminate a motor over-temperature state. Accordingly, the output rate calculation unit 21 may be configured to receive, in real time, the motor load (i.e. current regenerative braking torque) and the motor temperature during regenerative braking, and detect a motor load state (e.g. low load, medium load, or high load) from the current motor regenerative braking torque, to thus determine a torque output rate based on the current load state and motor temperature (S13 and S14).

The torque output rate (%) may be determined based on the load state and the motor temperature using the setting information illustrated in FIG. 4. Since the motor over-temperature state in which a current motor temperature is greater than the over-temperature judgment critical temperature Tover, a torque output rate below 100%, i.e. a torque output rate for reducing regenerative braking torque is determined. In addition, as described above, the output rate decision unit 22 may be configured to receive the torque output rate determined by the output rate calculation unit 21, and set the minimum value, among the torque output rate value input at the current time and torque output rate values determined after a regenerative braking cycle starts, to a final torque output rate value.

The final torque output rate determined by the output rate decision unit 22 may be input to the torque limitation unit 23, and the torque limitation unit 23 may be configured to calculate final regenerative braking torque by multiplying the initial regenerative braking torque, acquired from information such as, for example, battery chargeable power, by the torque output rate (%). In conclusion, the HCU 20 may be configured to produce a torque command, which corresponds to the final regenerative braking torque value limited by the torque output rate, and transmit the command to the MCU 30. The MCU 30 may then be configured to adjust regenerative braking of the motor 31 in response to the regenerative braking torque command received from the HCU 20. Accordingly, the output of the motor 31 may be limited based on the torque output rate, determined based on the motor load and motor temperature (S15), and the motor over-temperature state may be eliminated.

In addition, while the motor over-temperature state is eliminated as described above, the HCU 20 may be configured to detect the motor temperature detected by the sensor 32 to determine whether the motor temperature is increased (S16). When the motor temperature is not increased, a current limitation value, i.e. a current torque output rate for limiting motor regenerative braking torque may be maintained (S17). When the motor temperature is increased despite the motor regenerative braking torque limitation, a new torque output rate that corresponds to the increased motor temperature may be determined, and motor regenerative braking torque may be limited based on the determined new torque output rate (S13, S14 and S15).

Further, the torque output rate may be lower than the previous value since the motor temperature is increased, and consequently, a torque output rate lower than the previous value may be applied (i.e. the limitation rate is increased). Accordingly, reduced regenerative braking torque may be determined as final regenerative braking torque to further limit a motor regenerative braking amount (i.e. regenerative braking torque) and to reduce a motor output, thus enabling the elimination of the motor over-temperature state. Thereafter, when the driver disengages the brake pedal (driver brake-out), one regenerative braking cycle terminates (S18), and all torque output rates determined during the corresponding cycle may be deleted from the memory. When regenerative braking is again performed, a new torque output rate based on a motor load and motor temperature at the corresponding time may be again calculated and applied.

However, during one cycle from the time when regenerative braking starts to the time when the regenerative braking terminates, the minimum value among torque output rate values, which are repeatedly acquired for each control period, may be applied as a torque output rate for torque limitation. When a newly determined torque output rate is greater than a previous torque output rate, the previous lower torque output rate may be used to limit motor regenerative braking torque.

As is apparent from the above description, according to the present invention, since a torque output rate may be determined based on a motor load and motor temperature, motor regenerative braking torque limitation and output limitation may be achieved in consideration of both a current motor load and a current motor temperature. Accordingly, a motor over-temperature state may be rapidly eliminated, and a chattering phenomenon, in which motor regenerative braking torque (regenerative braking force) is repeatedly increased and reduced during regenerative braking, may be effectively prevented. In conclusion, vehicle braking safety and driver operability may be improved, and the durability of a vehicle including a motor may be improved by effectively preventing the motor over-temperature state.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method of controlling regenerative braking of an eco-friendly vehicle, comprising:
   detecting, by a controller, whether an over-temperature state of a motor exists, from a current temperature of the motor input during regenerative braking;

determining, by the controller, a torque output rate for motor regenerative braking torque limitation from a current motor load and the current motor temperature using setting information when the over-temperature state is detected;

determining, by the controller, a final regenerative braking torque by multiplying a regenerative braking torque of the motor, which is calculated from information including battery chargeable power and a driver braking operation value, by the determined torque output rate; and adjusting, by the controller, regenerative braking of the motor based on the determined final regenerative braking torque, wherein in the setting information, the torque output rate is set to be linearly reduced based on both the current temperature of the motor and the current motor load, and wherein, with regard to the current motor load, multiple motor load ranges are set and the torque output rate is set to a value that corresponds to each of the multiple motor load ranges.

2. The method of claim 1, wherein in the setting information, the torque output rate is a percentage value that is greater than 0 and less than 100.

3. The method of claim 1, wherein the setting information is data in which the torque output rate is preset to a value based on a motor load and a temperature of the motor.

4. The method of claim 3, wherein in the setting information, the torque output rate is set to a decreased value when the temperature of the motor is increased under a predetermined condition of the motor load.

5. The method of claim 3, wherein in the setting information, the torque output rate is set to a decreased value when the motor load is increased under a predetermined condition of the motor temperature.

6. The method of claim 3, wherein in the setting information, the torque output rate is set to a decreased value when the temperature of the motor is increased and the motor load is increased.

7. The method of claim 3, wherein in the setting information, with regard to the motor load, multiple motor load ranges include a low load range that is less than a first critical value, a medium load range that is equal to or greater than the first critical value and is less than a second critical value, and a high load range that is greater than the second critical value are set, and wherein the torque output rate is set to a value that corresponds to the low load range, the medium load range, or the high load range.

8. The method of claim 1, further comprising determining, by an output rate calculation unit, torque output rates in real time for each predetermined control period during one regenerative braking cycle and setting, by the controller, a lowest value, among torque output rates determined during one regenerative braking cycle from a time when a brake pedal is engaged as a braking operation to a time when the brake pedal is disengaged, to a final torque output rate.

9. A system of controlling regenerative braking of an eco-friendly vehicle, comprising:

a controller having a processor and a memory configured to:

detect whether an over-temperature state of a motor exists from a current temperature of the motor input during regenerative braking and to determine a torque output rate for motor regenerative braking torque limitation from a current motor load and the current temperature of the motor using setting information when the over-temperature state of the motor is detected;

determine a final regenerative braking torque by multiplying a regenerative braking torque, which is calculated from information including battery chargeable power and a driver braking operation value, by the determined torque output rate, to enable implementation of regenerative braking torque limitation; and adjust regenerative braking of the motor based on the determined final regenerative braking torque, wherein in the setting information, the torque output rate is set to be linearly reduced based on the current temperature of the motor and the current motor load, and wherein, with regard to the current motor load, multiple motor load ranges are set and the torque output rate is set to a value that corresponds to each of the multiple motor load ranges.

10. The system of claim 9, wherein in the setting information of an output rate calculation unit, the torque output rate is a percentage value that is greater than 0 and less than 100.

11. The system of claim 9, wherein the setting information is data in which the torque output rate is preset to a value based on a motor load and a temperature of the motor.

12. The system of claim 11, wherein in the setting information, the torque output rate is set to a decreased value when the temperature of the motor is increased under a predetermined condition of the motor load.

13. The system of claim 11, wherein in the setting information, the torque output rate is set to a decreased value when the motor load is increased under a predetermined condition of the motor temperature.

14. The system of claim 11, wherein in the setting information, the torque output rate is set to a decreased value when the temperature of the motor is increased and the motor load is increased.

15. The system of claim 11, wherein in the setting information, with regard to the motor load, multiple motor load ranges include a low load range that is less than a first critical value, a medium load range that is equal to or greater than the first critical value and is less than a second critical value, and a high load range that is greater than the second critical value are set, and wherein the torque output rate is set to a value that corresponds to the low load range, the medium load range, or the high load range.

16. The system of claim 9, wherein an output rate calculation unit is configured to determine torque output rates for each predetermined control period during one regenerative braking cycle and the controller is further configured to set a lowest value, among the torque output rates determined by the output rate calculation unit during the one regenerative braking cycle from a time when a brake pedal is engaged as a braking operation to a time when the brake pedal is disengaged, to a final torque output rate.

* * * * *